3,671,102
LAMELLAR EUTECTIC INSB SB FILMS AS INFRARED POLARIZERS
Arthur R. Clawson, San Diego, Neil M. Davis, Riverside, and Harry H. Weider and David A. Collins, San Diego, Calif., assignors to the United States of America as represented by the Secretary of the Navy
Filed Jan. 15, 1971, Ser. No. 106,800
Int. Cl. G02b 5/30
U.S. Cl. 350—147          1 Claim

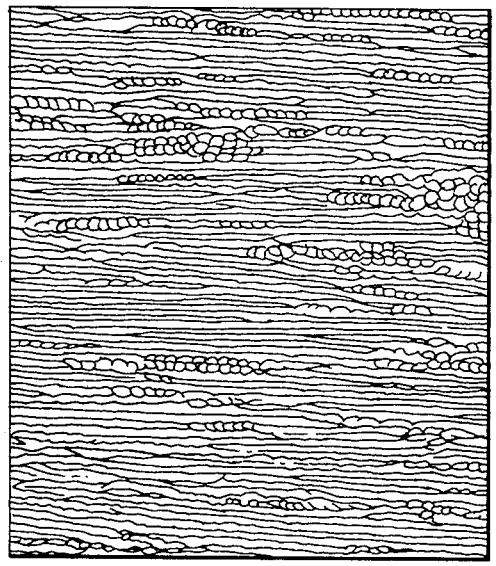
FIG. IA
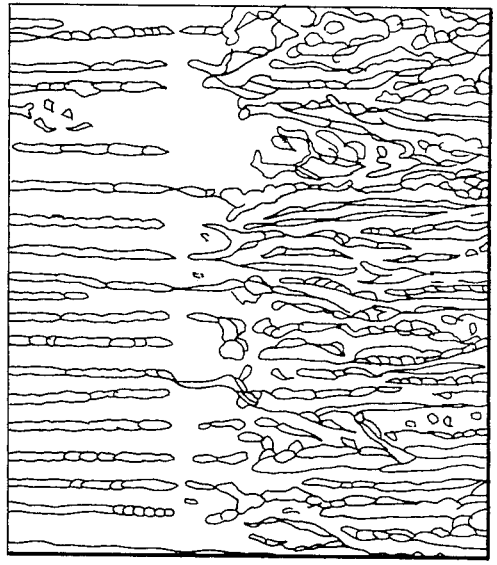
FIG. IB
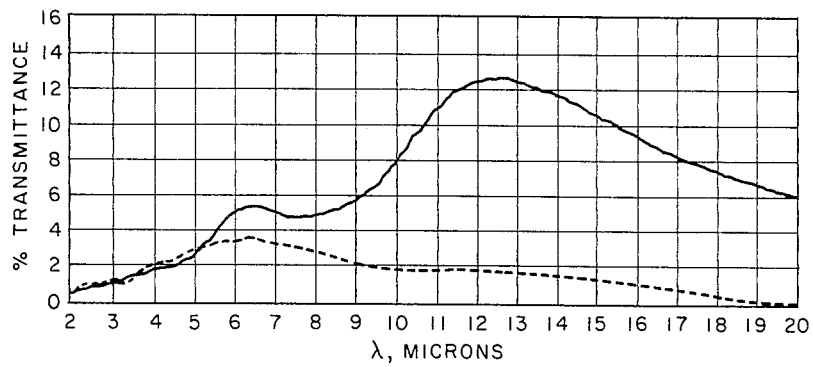
FIG. 2A
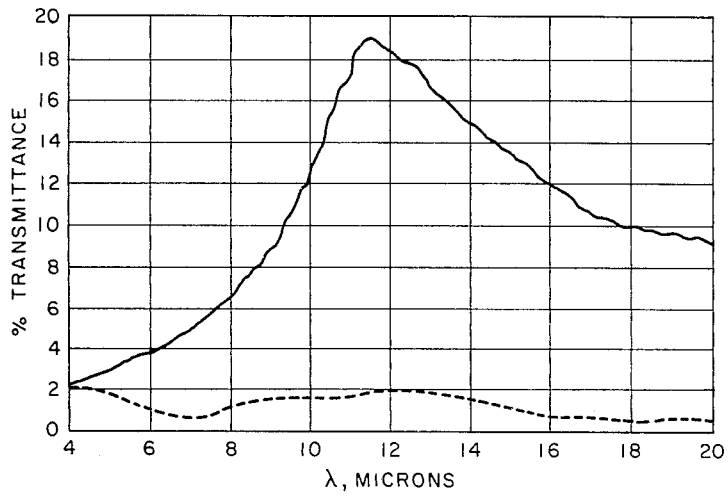
FIG. 2B
ARTHUR R. CLAWSON
NEIL M. DAVIS
HARRY H. WIEDER
DAVID A. COLLINS
INVENTOR.
BY J.M. St. Amand
ATTORNEY United States Patent Office  3,671,102
Patented June 20, 1972

ABSTRACT OF THE DISCLOSURE

An optical polarizer of lamellar eutectic InSb+Sb films grown by electron beam microzone crystallization, for use in the infrared region beyond 6 microns wavelength.

The invention herein described may be manufactured and used by or for the Government of the United States of America for governmental purposes without the payment of any royalties thereon or therefor.

Existing infrared polarizers are based primarily on the principle of a grating or array of closely-spaced conducting parallel rods or strips interacting anisotropically with the transverse electromagnetic waves of wavelength longer than the spacing between rods. Several techniques are used to make these polarizers, for example: (a) grids of fine wire are arranged to form a finely-spaced array; (b) conducting gold strips are vacuum deposited as an array on an infrared transmitting substrate such as silver chloride; (c) a metallic film is deposited on thin Mylar and an array etched on the surface; (d) conducting metallic rods are formed in an infrared transparent semiconductor matrix by directional solidification; or, (e) pyrolytic graphite is directionally solidified to form a highly anisotropic conductive film.

The performance of the various polarizers is similar, however, each has its limitations. The wire grid is limited by the mechanical size of the wire and maintenance of the small spacing. The conducting strips formed by vacuum deposition of a metal and etching of a grid by photolithographic techniques depends on the resolution of the lines (limited to $\sim$1 $\mu$m. spacing), and on the transmittance of the substrate. Silver chloride substrates are light sensitive, requiring special handling. They cannot be exposed to ambient light. A Mylar substrate has poor transmission characteristics in a portion of the infrared spectrum due to molecular absorption. Both the conducting metallic rods in a semiconductor, and the pyrolytic graphite depend on the perfection of directional ordering during growth, and also upon their transmission characteristics.

In this invention lamellar eutectic InSb+Sb films are grown by electron beam microzone crystallization and the Sb lamellae within the InSb matrix constitute a grating which acts as an infrared polarizer beyond the InSb absorption edge.

The primary advantages of InSb—Sb lamellar eutectic polarizer of this invention is its thin film nature. The film thickness is in the region where optical interference effects have an important influence on the transmission characteristics. The position of interference peaks in the transmittance is a function of film thickness. By tailoring the thickness a polarizer can be made with maximum transmittance at a desired wavelength, such as 10.6 $\mu$m. for a $CO_2$ laser. Taking advantage of the optical interference allows a greater transmittance than is possible with other available polarizers.

Another advantage of the InSb—Sb polarizer of this invention is that the plane of polarization can be charged by an applied magnetic field. Thus, such polarizers lend themselves to construction of nonreciprocal devices based on Faraday rotation.

The fabrication of the InSb—Sb eutectic film polarizer is a relatively simple technique compared to other polarizers.

It is an object of the present invention to provide a thin film InSb—Sb lamellar eutectic infrared polarizer.

Another object is to provide an TnSb—Sb polarizer wherein the plane of polarization can be changed by an applied magnetic field.

Other objects and many of the attendant advantages of this invention will become readily appreciated as the same becomes better understood by reference to the following detailed description when considered in connection with the accompanying drawings wherein:

FIG. 1a is an illustration of InSb+Sb eutectic film unidirectionally grown by electron-beam zone crystallization showing a uniform region of ordered lamellar microstructure.

FIG. 1b is an illustration of an InSb+Sb eutectic film unidirectionally grown by electron-beam zone crystallization showing a lamellar region in which the growth rate was abruptly increased.

FIG. 2a illustrates the infrared transmittance through lamellar InSb+Sb eutectic films showing $$T_\perp \text{ and } T_\parallel$$

as a function of wavelength for a representative 1.5 $\mu$m. thick film with 1.2 $\mu$m. mean lamellar width (i.e. width of conductive Sb) and 1.46 $\mu$m. mean interlamellar spacing (i.e. width of InSb).

FIG. 2b is a curve as in FIG. 2a for a 1.4 $\mu$m. thick film with the largest measured $$T_\perp \text{ below } \lambda = 20 \ \mu m.$$

Transverse electromagnetic waves acting, at normal incidence, on a grating or array or closely-spaced conducting parallel rods or strips are polarized by the interaction, provided that the wavelengths are longer than the interelement spacing in the array. The resultant polarization can be interpreted theoretically by assuming that the electric field of the incident radiation induces a colinear current flow in the conducting rods or strips. Each current increment, oscillating in time, constitutes an electric dipole and produces a radially symmetric field normal to the dipole axis. The resultant, summed over all the dipoles, represents a diffracted field. The net field transmitted through the grating is the vector sum of the incident and diffracted electric fields.

It is well known that a lamellar or rod-like crystalline morphology can be induced in eutectic alloys by directional solidification. The ternary system In—Sb—Ni was employed by Weiss and his co-workers, to produce bulk crystalline eutectics which solidify in the form of NiSb needles, $\sim$1 $\mu$m. in diameter and $\sim$50 $\mu$m. long, preferentially oriented within an InSb matrix. The NiSb needles represent 1.8% wt. of the pseudo-binary InSb+NiSb compound. In view of the high transmittance of InSb beyond its absorption edge and the relatively high conductance of NiSb, the preferentially oriented and spaced needles constitute, in effect, a metallurgically produced grating. Parallel-sided sections cut from such bulk eutectic crystals act effectively as polarizers for wavelengths $\lambda \gtrsim 7$ $\mu$m.

The binary intermetallic alloy system In—Sb has an eutectic at 494° C. for 69% wt. Sb. In this invention an electron beam was used as a tool for inducing, in vacuum, the synthesis and growth of lamellar eutectic, InSb+Sb films from previously vacuum-deposited composite films of Sb and In. These were evaporated onto microscope cover-glass substrates for a total Sb:In wt. ratio of 2.33.

They were then overcoated, by reactive evaporation, with a 50 to 200 A. thick $In_2O_3$ layer. The electron beam, scanned across the surface of such a composite film produces in it a molten zone ~500 μm. wide and ~0.5 cm. in length. The zone is translated, at a rate of ~$10^{-2}$ to $10^{-3}$ cm./s., across the film for distances ~1 to 1.5 cm. The temperature gradient normal to the molten zone is ~$3 \times 10^3$ °C./cm. This gradient and the velocity of zone displacement are so chosen as to preserve the planarity of the liquid-solid interface. This favors a lamellar or rod morphology for the films even though the molten zone may have a composition within a few percent off the eutectic.

FIG. 1a shows an InSb+Sb eutectic film grown by electron beam zone crystallization. It contains an ordered array of Sb lamellae within an InSb matrix. In FIG. 1b the molten zone was translated from left to right at a rate of ~$9 \times 10^{-3}$ cm./s. when the electron beam was shut off. The eutectic continued to grow into the molten zone at an accelerated rate. The morphology is still lamellar although less well-ordered; the inter-lamellar spacing is reduced. Turning off the electron beam produced the well-defined InSb-rich band, shown in FIG. 1b; evidently the thermal transient and change in growth rate produced a disturbance in the interphase equilibrium. Metallographic investigations show that the lamellae penetrate the entire film cross-section. Laue back-reflection and X-ray diffractometry were used to reveal a preferential {111} texture of the InSb matrix aligned parallel to the substrate; {511} diffraction peaks suggest extensive twinning. The Sb lamellae grow preferentially long <110>. Slight shifts of the Sb diffraction peaks might be due to a distortion of the Sb lattice brought about by a volume-preserving elastic strain in consequence of the matching between the Sb and InSb lattices.

The passive $In_2O_3$ surface layer is removed by etching or gentle polishing. Thereafter a circular area, up to 0.4 cm. in diameter, of the glass substrate is etched and removed by concentrated HF. Fortuitously, both InSb and Sb are chemically inert in HF (in concentrated form). A retaining rim at least 0.1 cm. wide bonds the periphery of the film to its substrate and allows optical measurements to be made on the unencumbered portion without special safeguards.

FIG. 2a shows the spectral dispersion, at normal incidence, of a representative eutectic film measured by means of a modified Beckman IR-3 spectrophotometer equipped with a polarizer. The perpendicular intensity transmittance $$T_\perp$$

was obtained with the electric field of the incident radiation normal to the lamellar axes;

$$T_\parallel$$

is the corresponding transmittance for a parallel orientation. A stylus gauge was used to determine the film thickness $d=1.5$ μm. The difference between $$T_\perp \text{ and } T_\parallel$$

beyond the InSb absorption edge illustrates the effect of polarization, defined as $$P = (T_\perp - T_\parallel)/(T_\perp - T_\parallel)$$

induced by the "lamellar grating." The increase in P with λ is to be expected, on theoretical grounds, as λ becomes much larger than the interlamellar spacing δ. The mean width of the lamellae in FIG. 2a is estimated to be 1.2 μm. and the means $δ \simeq 1.46$ μm. The peaks in $$T_\perp \text{ vs } \lambda$$

are interference fringes. In terms of the relation $2n_r d = N\lambda$ for transmittance maxima, where $n_r$ the index of refraction of InSb is 3.92 and 4.03 for $\lambda = 12.4$ μm. and 6.3 μm. and the corresponding fringe orders, N are taken as 1 and 2 respectively, the mean optical film thickness $d_0 = 1.56$ μm. is in good agreement with d measured by means of the stylus gauge. Such an interference phenomenon is also illustrated in FIG. 2b which represents the highest $$P \text{ and } T_\perp$$

obtained thus far on eutectic InSb+Sb films below $\lambda = 20$ μm.

An even higher degree of ordering of the lamellae can be achieved by techniques of this invention; this is bound to increase P as well as $$T_\perp$$

A further advantage of film polarizers is that d can be deliberately chosen for an interference maximum at a specific wavelength, such, for example, as that of a $CO_2$ laser.

Alternative methods of preparing this polarizer include using other heating techniques for forming the molten zone used to directionally solidify the eutectic, such as a hot wire source. Mechanical rigidity can be improved by supporting the free standing portion of InSb with a mesh of vacuum deposited metal lines which cover only a small portion of the film and have large spacing compared to the active wavelength. Similarly, use of a transparent substrate such as a 20 μm. thick sapphire platelet would allow fabrication of the directionally solidified eutectic film without removing the substrate.

Other binary eutectic alloy systems could possibly be used in place of the In—Sb alloy. The requirement would be the formation of a eutectic with both a metallic-phase constituent and a semiconductor-phase constituent. Not enough is known about what other systems would work, however, possibly Ge—Al, Ge—Ag, Ge—Au, or pseudo-binary systems similar to InSb—NiSb.

Another alternative technique is to grow a pure semiconductor film, rather than the lamellar eutectic, and provide the conductive grid lines by deposition of a metal on the semiconductor. Photolithographic techniques can be used to form the necessary fine-structure grid pattern.

What is claimed is:
1. An optical infrared polarizer comprising:
   (a) a lamellar vacuum-deposited eutectic InSb+Sb thin film having a directionally solidified eutectic;
   (b) the Sb in said thin film forming a lamellar grating within a matrix of InSb, said lamellar grating acting as an infrared polarizer beyond the InSb adsorption edge;
   (c) a mesh of deposited metal lines, covering only a small portion of the film and having large spacing compared to the active wavelength to impart mechanical rigidity to the thin film.

References Cited

UNITED STATES PATENTS 3,443,854   5/1969   Weiss _____ 350—147
3,439,973   4/1969   Paul et al. _____ 350—147

OTHER REFERENCES

Davis et al.: "Lamellar Eutectic InSb+Sb Films as Infrared Polarizers," App. Phys. Lett., vol. 15, No. 7 (Oct. 1, 1969), pp. 213–215.

DAVID SCHONBERG, Primary Examiner

P. R. MILLER, Assistant Examiner

U.S. Cl. X.R.

350—1, 152, 162 R